US005867776A

United States Patent [19]

Noda

[11] Patent Number: 5,867,776

[45] Date of Patent: Feb. 2, 1999

[54] RECEIVER FOR RECEIVING TEXT-BASED MULTIPLEX BROADCASTS

[75] Inventor: Fumio Noda, Kanagawa, Japan

[73] Assignee: Sony Corporation, Tokyo, Japan

[21] Appl. No.: 696,209

[22] Filed: Aug. 13, 1996

[30] Foreign Application Priority Data

Aug. 21, 1995 [JP] Japan .................................... 7-234711

[51] Int. Cl.$^6$ ........................................................ H04B 1/18

[52] U.S. Cl. ..................... 455/186.1; 455/31.3; 455/412; 455/458; 340/825.44

[58] Field of Search ................................ 455/38.1, 38.4, 455/31.2, 31.1, 32.1, 418, 412, 186.1, 458; 340/825.44, 825.26

[56] References Cited

U.S. PATENT DOCUMENTS

| | | | |
|---|---|---|---|
| 5,128,933 | 7/1992 | Baranoff-Rossine | 370/69.1 |
| 5,535,428 | 7/1996 | King et al. | 455/38.4 |
| 5,694,120 | 12/1997 | Idekeu et al. | 340/825.44 |

FOREIGN PATENT DOCUMENTS

| | | | |
|---|---|---|---|
| 4036851 | 5/1991 | Germany | H04H 1/00 |
| 7058713 | 3/1995 | Japan | H04H 1/00 |
| 7099459 | 4/1995 | Japan | H04B 1/06 |
| 7327016 | 12/1995 | Japan | H04H 5/00 |
| 7046177 | 2/1996 | Japan | H04B 7/26 |
| 8079206 | 3/1996 | Japan | H04H 5/00 |
| 8130487 | 5/1996 | Japan | H04B 1/16 |

*Primary Examiner*—Reinhard J. Eisenzopf
*Assistant Examiner*—Darnell R. Armstrong
*Attorney, Agent, or Firm*—Jay H. Maioli

[57] ABSTRACT

An FM text-based multiplex broadcasting receiver includes a memory in which an identity code is written, a determining circuit for determining whether or not an identity code which coincides with the identity code written in the memory is contained in the received broadcast, a device for disclosing a keyword having a one-to-one correspondence with the identity code written in the memory, and a display element which cannot receive information services based on data that requires a contract when the determining circuit does not detect that the identity code written in the memory is contained in the received broadcast and which displays information based on data that requires a contract when the determining circuit detects that the identity code written in the memory is contained in the received broadcast.

4 Claims, 7 Drawing Sheets

RECEIVER FOR RECEIVING TEXT-BASED MULTIPLEX BROADCASTS

BACKGROUND OF THE INVENTION

1. Field of the Invention

The present invention relates to a receiver for receiving text-based multiplex broadcasts such as FM text-based multiplex broadcasts.

2. Description of the Related Art

In Japan, for example, FM broadcasts called "FM text-based multiplex broadcast" are realized in which character information data or the like is multiplexed and transmitted together with the original audio broadcast program. Meanwhile, FM receivers for receiving these broadcasts and displaying character information on a display device, such as a liquid crystal display device (LCD), are also commercially available.

Such FM text-based multiplex broadcast, in whose development the NHK Broadcasting Technology Research Institute has played a key role, includes the capacity for mobile reception in an automobile or the like, and is called a DARC (DAta Radio Channel) method. The multiplexing standard for digital data, such as character information, is as follows: a subcarrier frequency of 76 kHz, a transmission rate of 16 kilobits per second, a modulation method of LMSK (Level-Controlled Minimum Shift Keying), and an error correction method using a (272, 190) compacted difference set cyclic code.

Program services such as character information can be classified into levels 1, 2 and 3. In all three cases, character information is displayed using a dot display. In level 1, the information is provided as character information targeted as a service for a receiver capable of displaying 15.5 characters×2.5 lines, including a header. In level 2, the information is provided as characters or figures targeted as a service adopting a receiver capable of displaying 15.5 characters×8.5 lines, including a header. Level 3 is for traffic information services provided for receivers capable of displaying detailed maps from a CD-ROM (Compact Disc Read-Only Memory) or the like, namely, navigation systems.

Level 1 program services can be utilized for news, weather forecasts, traffic information, entertainment, main supplemental programs and the like. Entertainment would include services providing fortune telling, messages from listeners, quizzes, town information and the like.

A main supplemental program provides information for supplementing a program such as the song name, performers name and telephone and fax numbers for requests when the original audio broadcast program is, for example, a music program. The main supplemental programs will be hereinafter referred to as "program information" or "program linkage".

In addition to the above services, "emergency information" may also be provided as required at the time of emergencies.

FIG. 3 shows the frame structure of an LMSK signal which is multiplexed in the FM text-based multiplex broadcast of a DARC method. One frame of this LMSK signal is comprised of 272 blocks, with each block comprising 288 bits.

One frame comprising 272 blocks is divided into 190 data packet blocks and 82 vertical parity packet blocks, with the vertical parity packet blocks being distributed and transmitted.

A 16-bit BIC (Block Identity Code) is attached to the head of each block. Four kinds of BIC are used for distinguishing each of the parity packets, and thus the heads of the frames can be discerned.

The data packet block has a 176-bit data packet following the BIC, after which a 14-bit CRC (Cyclic Redundancy Check) code is added, followed by an 82-bit horizontal parity check code. The CRC code is attached for detecting residual errors after error correction using a product code. The vertical parity packet block is provided to have a 272-bit vertical parity packet following the BIC.

Each data packet comprises a 32-bit prefix followed by a 144-bit data block, as shown in the upper portion of FIG. 4.

This prefix comprises a service identity code, a decode identity flag, an information end flag, a renewal flag, a program number, a page number, a data link code and a data packet number, as shown in the lower portion of FIG. 4.

The service identity code consists of 4 bits and is for discerning the program contents and the like. Regarding level 1, "1" is general information for sequential reception processing, "2" is general information for recording and reception processing, and "4" is for traffic information.

Sequential reception processing is a mode for the receiver starting decoding processing for displaying on receipt of the first data packet of the program data or the page data. Recording and reception processing is a mode for not starting decoding processing for displaying until all of the data for the program data or the page data are received and recorded and then error correction is carried out the CRC code for every data group.

Sequential reception processing is carried out for a program where the information must be transmitted with preparation of suitable display timing on the receiving side or for a program where the information will not be displayed in time if the decoding processing is started after the last packet of the data group is obtained.

In the prefix, the decode identity flag is one bit, and is "1" when the error correction circuit for the receiver outputs data by decoding in the horizontal direction only, and "0" when the data is output after decoding in the horizontal direction and the vertical direction.

Sequential reception processing when the decode identity flag is "0" is defined in such a manner that decoding processing for displaying each of the data packets is carried out at the time when the receiver receives the BIC at the head of the 302nd packet from receipt of the BIC at the head of the first data packets.

The information end flag is one bit and is "1" when transmission of a data group with a certain data group number is completed, and "0" when this is not the case. The renewal flag is two bits, and is incremented by one every time a data group is updated. The program number is 8 bits, and the page number is 6 bits, with the data group number being formed using both of these items.

The program number is from 0 to 255, the "main menu" being assigned to "1", the main supplement program (program information or program linkage) being assigned to "254" and emergency information being assigned to "255".

The program number is from 1 to 62, i.e., one program can have a maximum of 62 pages. One page corresponds to one to four of the data groups, with one data group comprising one or a plurality of data blocks.

The data link code is 2 bits and is used for linking each group of the divided data group. When the data is so large that the number of the data packets belonging to one data group exceeds the maximum value of the data packet number, the data group is divided into a maximum of 4 groups with different data link codes. The data group is then transmitted with the divided groups of the same group number and different data link codes being linked in the order of the code numbers 0→1→2→3.

The data packet number is 8 bits long, and is aligned in sequence from 0. The data packet number indicates the sequence of the data packets in one program. That is, the data packet indicates in which position the data packet is placed in one program.

Therefore, in the same program, the service identity code and the program number become the same. Or, in a plurality of data packets, if the service identity code and the program number are the same, the data packet is a packet which forms the same program.

At level 1, one page is usually displayed in the form of 15.5 characters×2.5 lines, but can also be displayed in the form of 15.5 characters×8.5 lines. Further, in this case, the character data is for displaying characters defined by JIS (Japanese Industrial Standard) code.

As described above and as shown in FIG. 5, the receiver compatible with level 1 has, for example, an LCD (liquid crystal display device) 1 having a display screen 1*a* capable of displaying 15.5 characters×2.5 lines. The 15.5 characters by 2 lines portion 1*b* of the lower portion of the display screen 1*a* is for displaying text and the 0.5 line portion 1*c* of the upper portion is a header text display screen.

The receiver receives a stereo composite signal and an LMSK signal, and decodes the character data from this LMSK signal to write the data in a buffer memory.

A "main menu" key is provided at the receiver and the receiver displays the main menu on the display screen 1*a* as a result of the manipulation of this key, in the way shown in FIG. 6A. FIG. 6A shows characters "1. PROGRAM INFORMATION" and "2. NEWS AND SPORTS" displayed as the first page of the main menu extending over a plurality of pages or the first 2.5 lines of a page of a text in an 8.5 lines display format.

Displayed in the header section are the broadcasting station name 1*d* which is broadcasting the FM text-based multiplex broadcast that is currently being received by this FM receiver, the service (company) name 1*e* of the FM text-based multiplex broadcast, and the menu name 1*f*.

The receiver is further provided with a "page (screen) scroll" key. By operating this key, "3. WEATHER FORECAST" and "4. TRAFFIC INFORMATION" of the next page or the next two lines of text of a page in the 8.5 line display format are displayed on the display screen 1*a*, as shown in FIG. 6B.

When the user decides upon the number of an item that the user wishes to see from the main menu, then the menu of the selected item is further made to be displayed. For example, when the user selects "3. WEATHER FORECAST" from within the main menu, then the contents "1. TODAY'S WEATHER 2. TOMORROW'S WEATHER" are displayed, as shown in FIG. 6C.

Further, when the user decides upon the number of an item that the user wishes to see from within the menu, then the first page of the selected item is shown. For example, when the user selects "1. TODAY'S WEATHER" from the menu, specific character information relating to the "1. TODAY'S WEATHER" is displayed, as shown in FIG. 6D.

FIGS. 6A to 6D show displays in Japanese in compliance with the JIS standard. For reference, the displays of FIGS. 6A to 6D in English are shown in FIG. 7A to 7D, respectively (in the DARC method, display and transmission in only English is not yet performed; however, there is a possibility that transmission compatible with an English display will be performed in the future).

The above describes a case in which FM text-based multiplex broadcasting provides a program of text information or the like. In the FM text-based multiplex broadcast, it is further envisioned that a paging system will be provided. Such paging system is a pay service offered to users individually who have signed a contract beforehand, and calls a user individually as a pager and provides stock prices, horse racing information, specific news, and the like.

In this paging system, as shown in FIG. 8A, each data packet is made up of a prefix of 16 bits and a data block of 160 bits. The prefix, as shown in FIG. 8B, is made up of a service identity code, a decoding identity flag, an information end flag, a renewal flag, a data group number, and a data packet number.

Data in which the service identity code and the data group number of the above elements are excluded is the same as that when a program service for the above-described character information is provided; when a paging system is to be provided, the service identity code is set at 11: paging information.

The data group number is 4 bits and indicates the data group in the paging system. In the case of the paging system, the data group is made up of one or more data blocks, as shown in FIG. 9A.

Further, the information in the case of the paging system is composed of information units called segments. Since a segment is usually smaller than a data block, as shown in FIG. 9B, one data group is formed of one or more segments, with the data group ending with a 16-bit CRC code for detecting errors of the data group. Since the length of the segment is arbitrary, when unnecessary bits occur between the end segment and the CRC code, those bits are set to "0" (null codes).

The segment, as shown in FIG. 9C, is made up of a segment header of 1 to 4 bytes and segment data of 1 or more bytes. The segment header, as shown in FIG. 9D, is made up of a segment identity code of 4 bits and segment length data formed by the remaining bits.

In this case, the segment identity code indicates the contents of the segment data, and the segment length data indicates the length of the segment data, namely, the number of bytes. The values of the segment identity codes and the contents indicated thereby are set as follows: 13: calling data, 10: alternate frequency information, 1: scramble information, and 9: common information.

When the contents of the segment data indicated by the segment identity code is calling data, the segment data, when users who have been registered beforehand are called individually or in group, is an identity code which specifies that user. Further, when information is to be sent to that user, the segment data has data relating to such information.

In the case of alternate frequency information, the segment data is alternate frequency information for paging information. In the case of scramble information, the segment data is scramble information for encryption. In the case of traffic information, the segment data is information common to all users.

When the contents of the segment data indicated by the segment identity code is calling data, the calling data (the segment data) is formed into a structure as shown in FIG. 10.

That is, the ID group identity code is 2 bytes in size and is, when the identity code which specifies the user is formed into a group, data which specifies the group. A message identity code (MID) is 2 bits in size and indicates whether or not a message (data) is attached to the identity code. The values and the contents the ID group identity code are set as follows: 0: a message is present in the identity code, 1: no message is present in the identity code, 2: undefined, and 3: undefined.

The number of calls indicates the number of users (the number of identity codes) to be called by this calling data. Following this number of calls, the identity codes of the users who are called actually are each written in the size of 3 bytes. FIG. 10 shows a case in which there are N users who are called at MID=0, and there are M users who are called at MID=1.

When MID=1, messages are sent to the M users respectively. The data which indicates the type of the contents for each message is a character type. This character type is 2 bits in size, and the values and the contents thereof are set as follows: 0: fixed-type message, 1: numeral.fixed-type message, 2: character (8-unit code system), and 3: binary data.

In such a case, when the character type is a fixed-type message, the remaining 6bytes is made to be data for selecting one of the plurality of fixed-type messages which are prepared beforehand, and no message is assumed to has been input.

When the character type is a numeral·fixed-type message, numerals and several kinds of symbols are represented by 4-bit codes, and a message is sent in 4-bit units. When the character type is a character, a message is sent mainly in characters of Kanji and the like, and when the character type is binary data, a message in binary data is sent. Further, for each character type, data indicating the data length of the message follows, as well as an actual message.

Therefore, if the following is performed, the user is able to individually receive information services. That is, a ROM in which the above-described identity code is written is provided in the FM receiver of the user. When calling data is received, the identity code contained in the calling data is compared with the identity code written in the ROM. When the result of the comparison is no match, no action is taken; however, when the comparison results in a match, a corresponding process is performed in accordance with the MID and the message.

In this way, the following services can be realized:

users are called individually messages are sent to the users individually, for example, information, such as stock prices, horse racing information, or specific news, is provided to a user who has signed a contract beforehand.

As described above, use of a paging system of an FM text-based broadcast makes it possible for a user who has signed a contract beforehand to receive information services individually.

However, in order to write an identity code in the ROM of the FM receiver, the user must bring or send that FM receiver to an information service agency having a ROM writer. Further, it is necessary for that agency to prepare a ROM writer. It is further necessary to train persons who are able to handle the ROM writer. Further, since an identity code is written in the incorporated ROM, the FM receiver must be provided with a connector for connection purposes. Thus, the number of parts of the receiver is increased, and the receiver becomes complex.

SUMMARY OF THE INVENTION

The present invention aims to solve the above-described problems.

To this end, according to the present invention, there is provided a receiver for a broadcast in which data that does not require a contract in advance, data that requires a contract in advance, and an identity code for specifying a user are multiplexed onto a main signal and transmitted, the receiver comprising: a receiving circuit for receiving the broadcast; a display element; a memory in which an identity code is written; a circuit for determining whether or not an identity code which coincides with the identity code written in the memory is contained in the received broadcast; and means for disclosing a keyword, wherein the keyword is made to correspond to the identity code written in the memory, when the determining circuit does not detect that the identity code written in the memory is contained in the received broadcast, information services based on data that requires a contract cannot be received, and when the determining circuit detects that the identity code written in the memory is contained in the received broadcast, information services based on data that requires a contract are performed.

The above and further objects, aspects and novel features of the invention will become more apparent from the following detailed description when read in connection with the accompanying drawings.

DESCRIPTION OF THE PREFERRED EMBODIMENT

Figure 1:
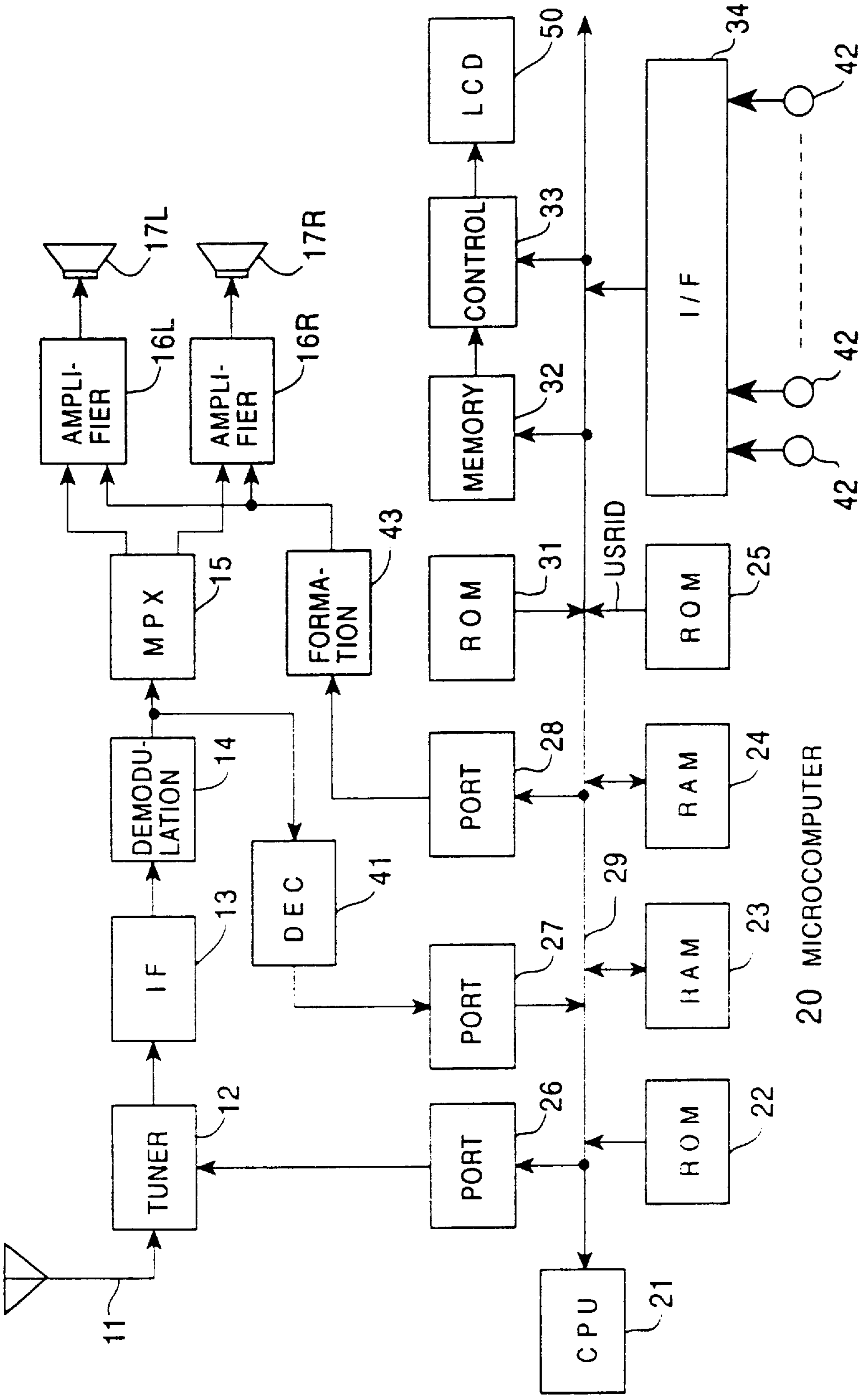
FIG. 1 is a system diagram illustrating an embodiment of the present invention.

FIG. 1 shows the case of a level 1-compatible FM receiver according to an embodiment of the present invention.

In the FM receiver of this embodiment, an FM signal received by an antenna 11 is provided to a tuner circuit 12 of a synthesizer method, whereby a broadcasting station of the desired frequency is selected and the FM signal is converted into an intermediate signal. This intermediate signal is provided to an FM demodulation circuit 14 via an intermediate frequency amplifier 13.

Then, taken out from the FM demodulation circuit 14 is a frequency multiplexed signal of a dual side-band signal which is balance-modulated with a sum signal (L+R) and a difference signal (L−R) of the left and right channels of a stereo audio signals L and R, a pilot signal, and the aforementioned LMSK signal in the above-described FM text-based multiplex broadcast.

This frequency multiplexed signal is then provided to a stereo demodulation circuit 15 where left and right signals L and R are demodulated from the sum signal (L and R) and the DSB signal. These audio signals L and R are then provided to left and right channel speakers 17L and 17R via amplifiers 16L and 16R, respectively.

Further, this FM receiver is provided with a microcomputer 20 for selecting a station in the tuner circuit 12 and for displaying characters through an FM text-based multiplex broadcast.

This microcomputer 20 comprises a CPU 21 for executing programs, a ROM 22 used for the programs, a RAM 23 used as a work area, a second RAM 24 for use as a buffer for receiving FM text-based multiplex broadcast data, and a second ROM 25 used for identity codes.

Prepared in the ROM 22 are various routines and a data table of character strings for displaying fixed-type messages, as well as a routine for using a paging system. Written in the ROM 25 is an identity code USRID which is required when an information service based on the above-described paging system is received. The memories 22 to 25 are connected to the CPU 21 through a system bus 29.

Ports 26 to 28 and an interface circuit 34 are connected to the system bus 29. Data for selecting a station is provided to the tuner circuit 12 from the the port 25, and station selection is made. A demodulation signal from the demodulation circuit 14 is provided to a decoding circuit 41 whereby data in the FM text-based multiplex broadcast is decoded, error-corrected and taken out from the LMSK signal. This data is provided to the microcomputer 20 through the port 27.

A circuit 43 for forming a beep sound signal is connected to the port 28. The beep sound signal is provided to the amplifiers 16L and 16R. Various operation keys 42 which are made up of non-lock-type push switches are connected to the interface circuit 34, and the key outputs are input to the microcomputer 20. In this way, when any key of the operation keys 42 is pressed, the pressed key is determined by the CPU 21, and a process corresponding to the pressed key is performed.

Further connected to the system bus 29 are a font ROM (character generator) 31 having font data for converting character data received through an FM text-based multiplex broadcast into display data, as well as a memory 32 for display use, and a display controller 33, with, for example, an LCD 50 being connected, as a display element, to the controller 33.

The LCD 50 has a display screen capable of displaying 15.5 characters×2.5 lines in the same way as for the aforementioned LCD 1. The memory 32 adopts a bit map method compatible with the dot display method of the LCD 50 and has a capacity for one screen.

Figure 2:
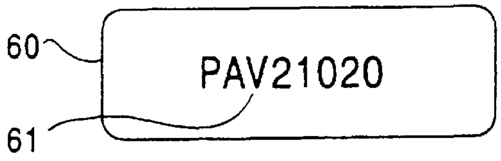
FIG. 2 is a front view illustrating the embodiment of the present invention.
Figure 3:
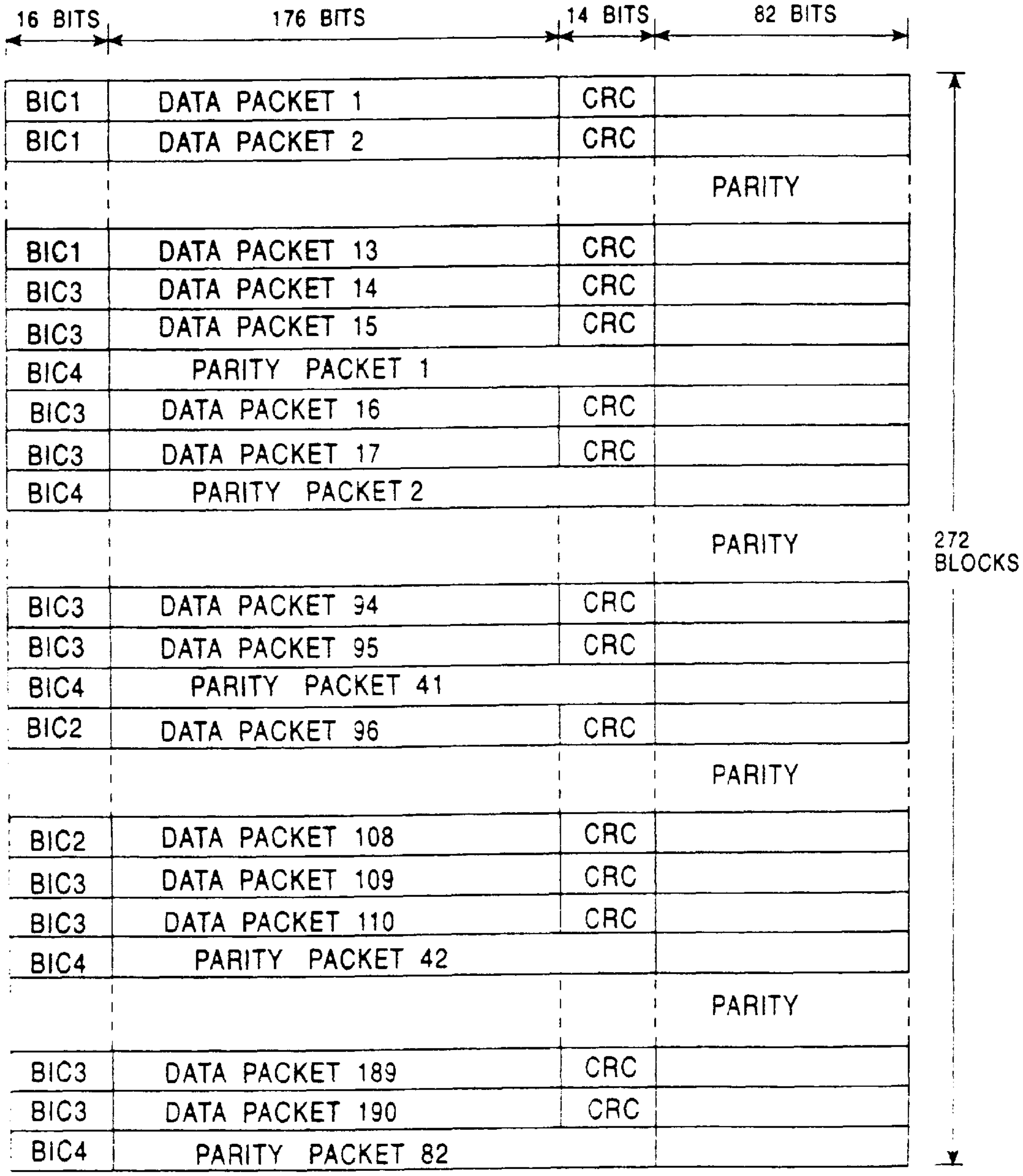
FIG. 3 shows a signal format.
Figure 4:
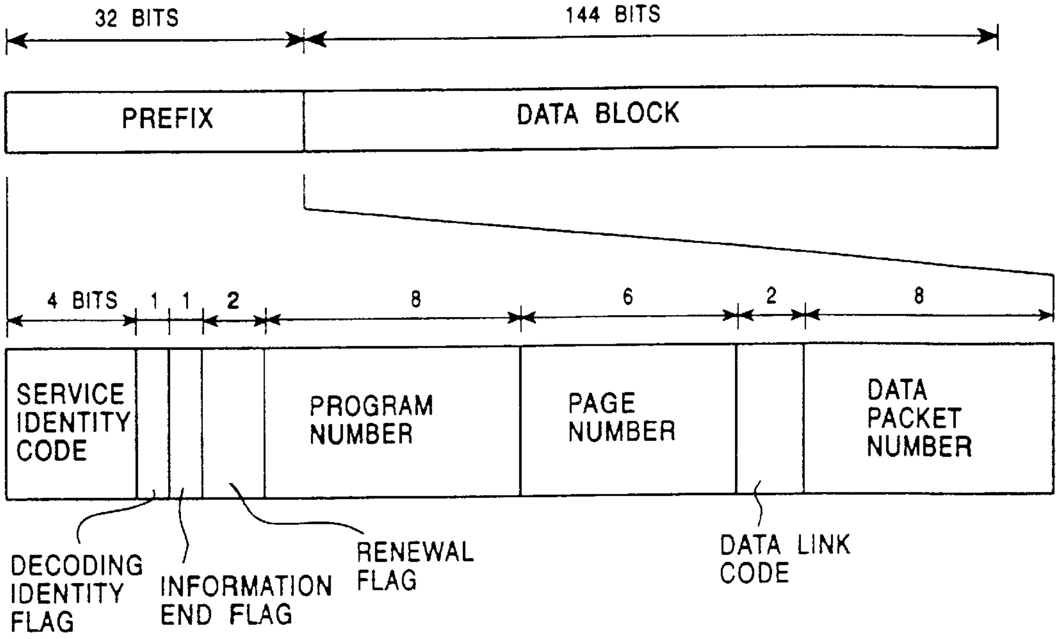
FIG. 4 shows the signal format.
Figure 5:
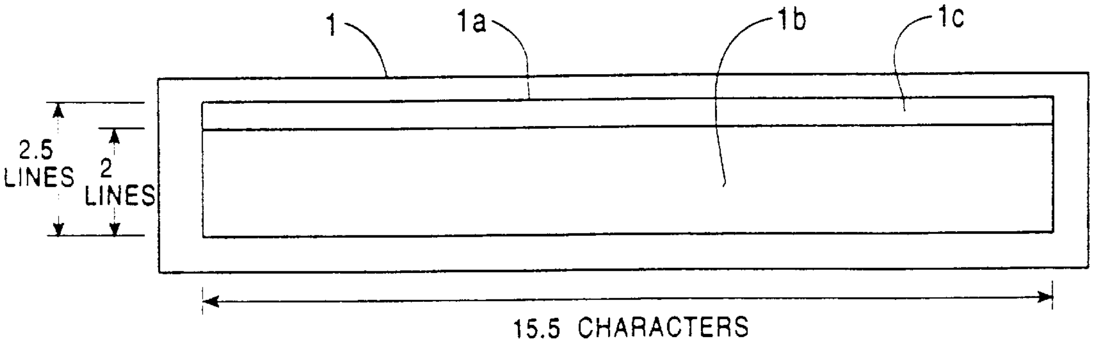
FIG. 5 shows a display screen.
Figure 6:
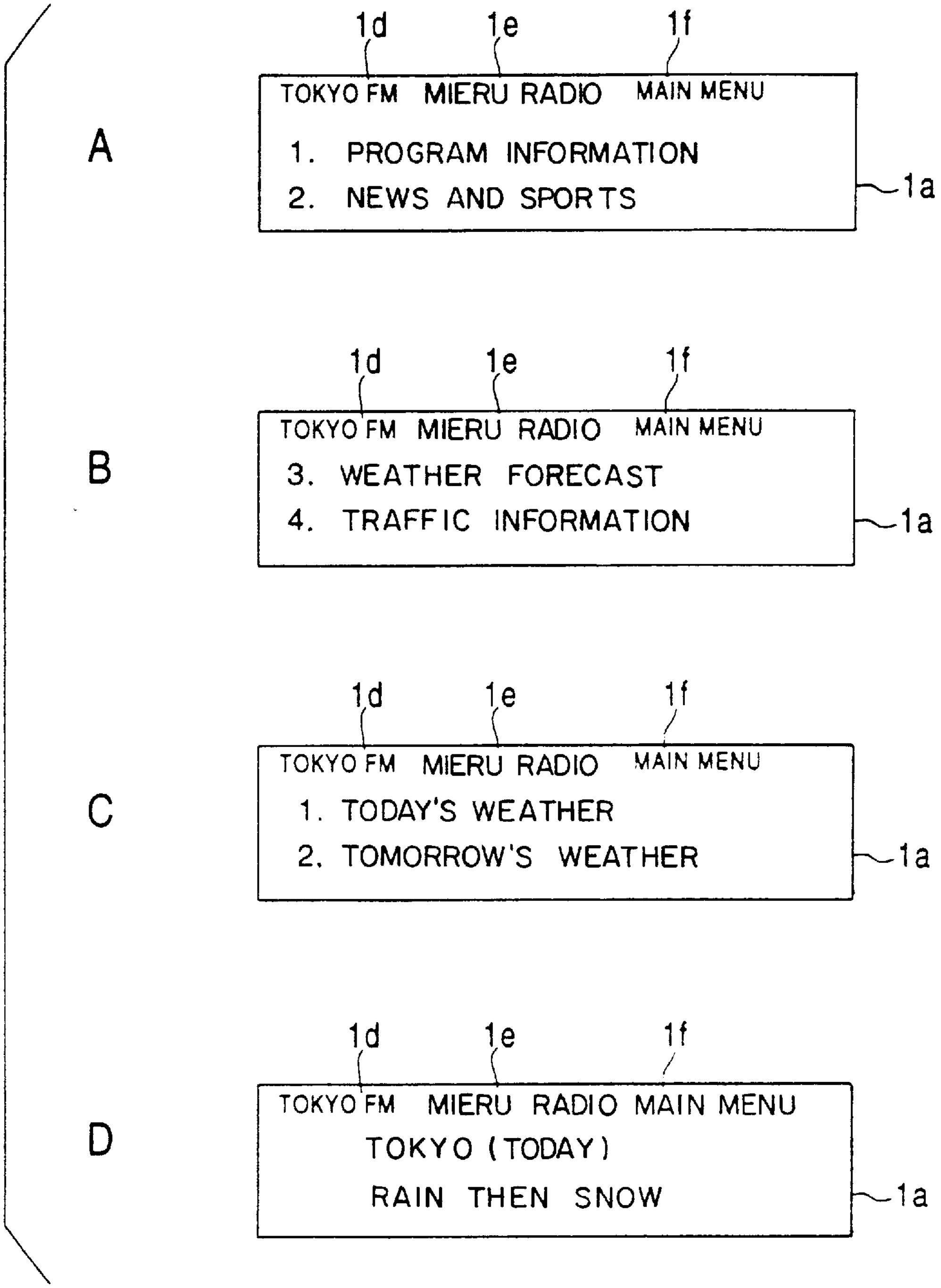
FIGS. 6A, 6B, 6C and 6D show the display screen.
Figure 7:
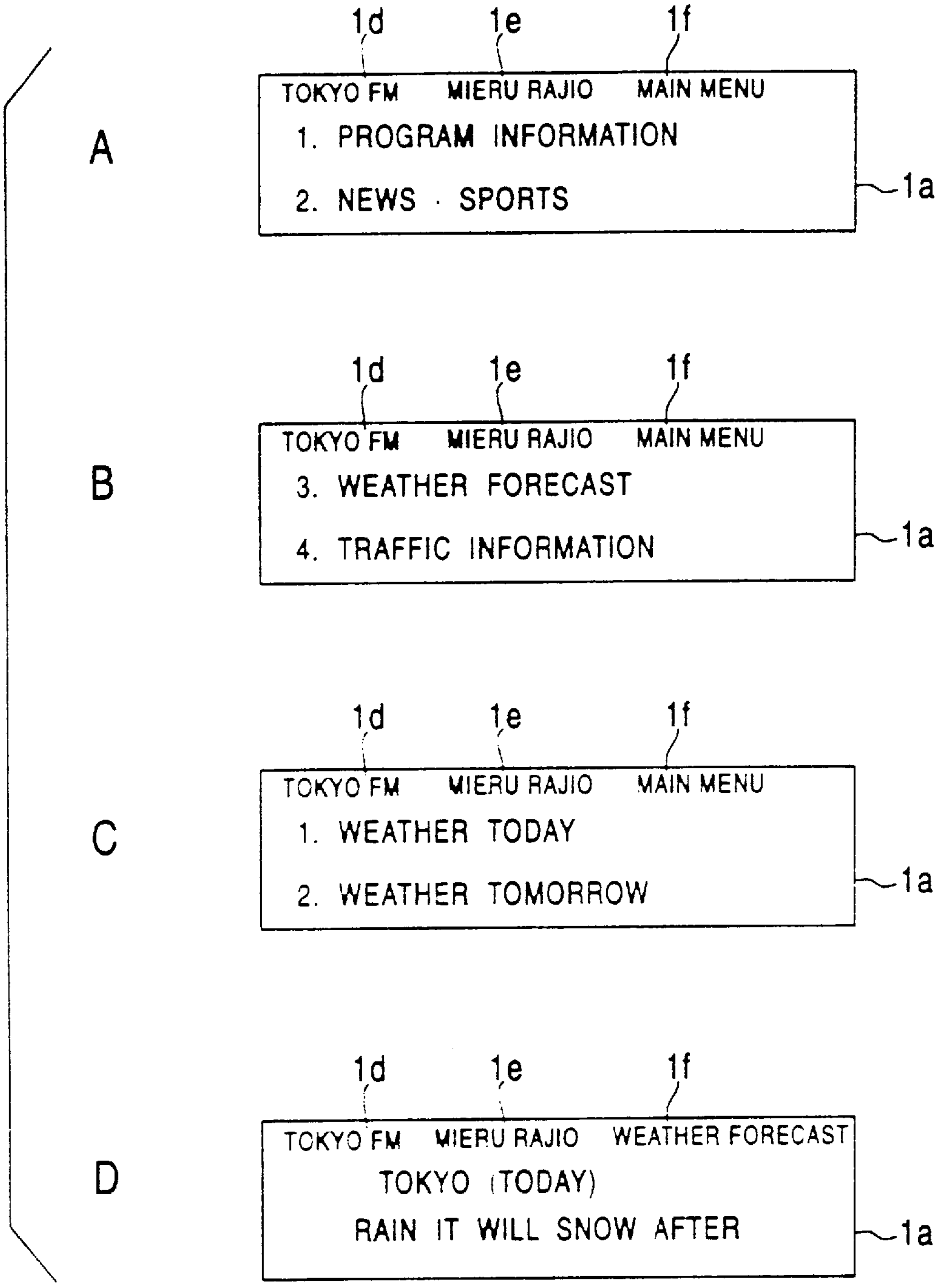
FIGS. 7A, 7B, 7C and 7D show the display screen.
Figure 8:
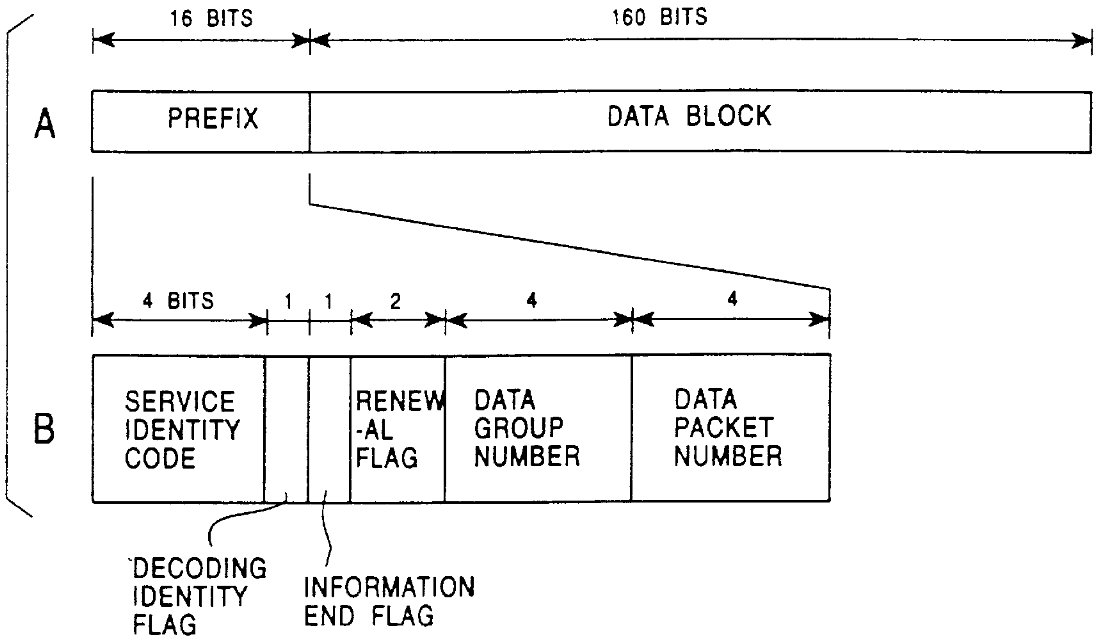
FIGS. 8A and 8B show the signal format.
Figure 9:
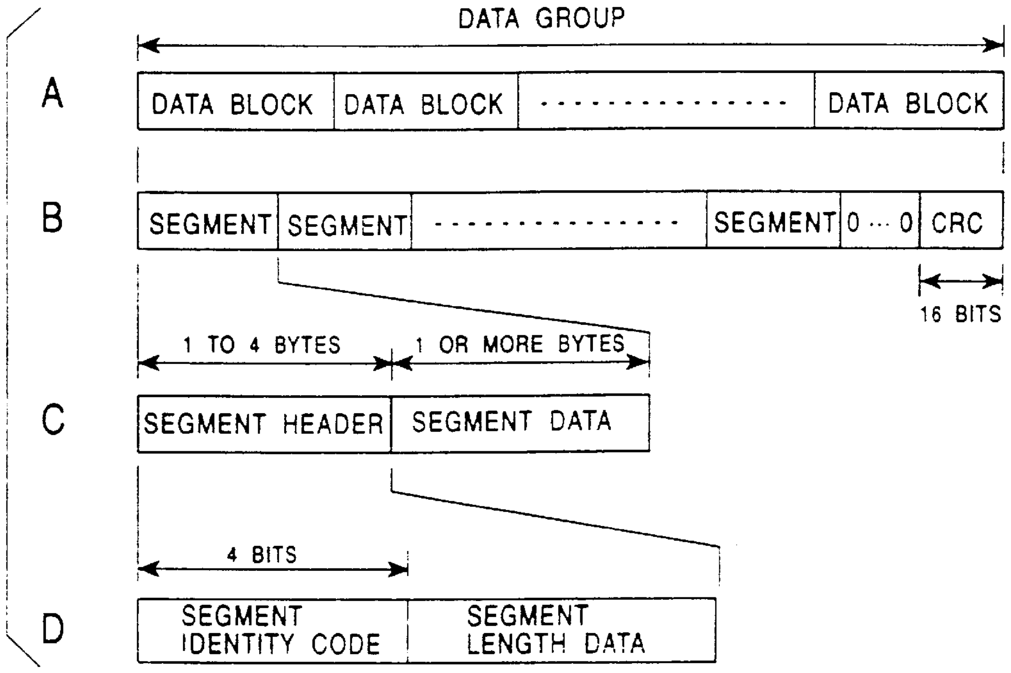
FIGS. 9A, 9B, 9C and 9D show the signal format.
Figure 10:
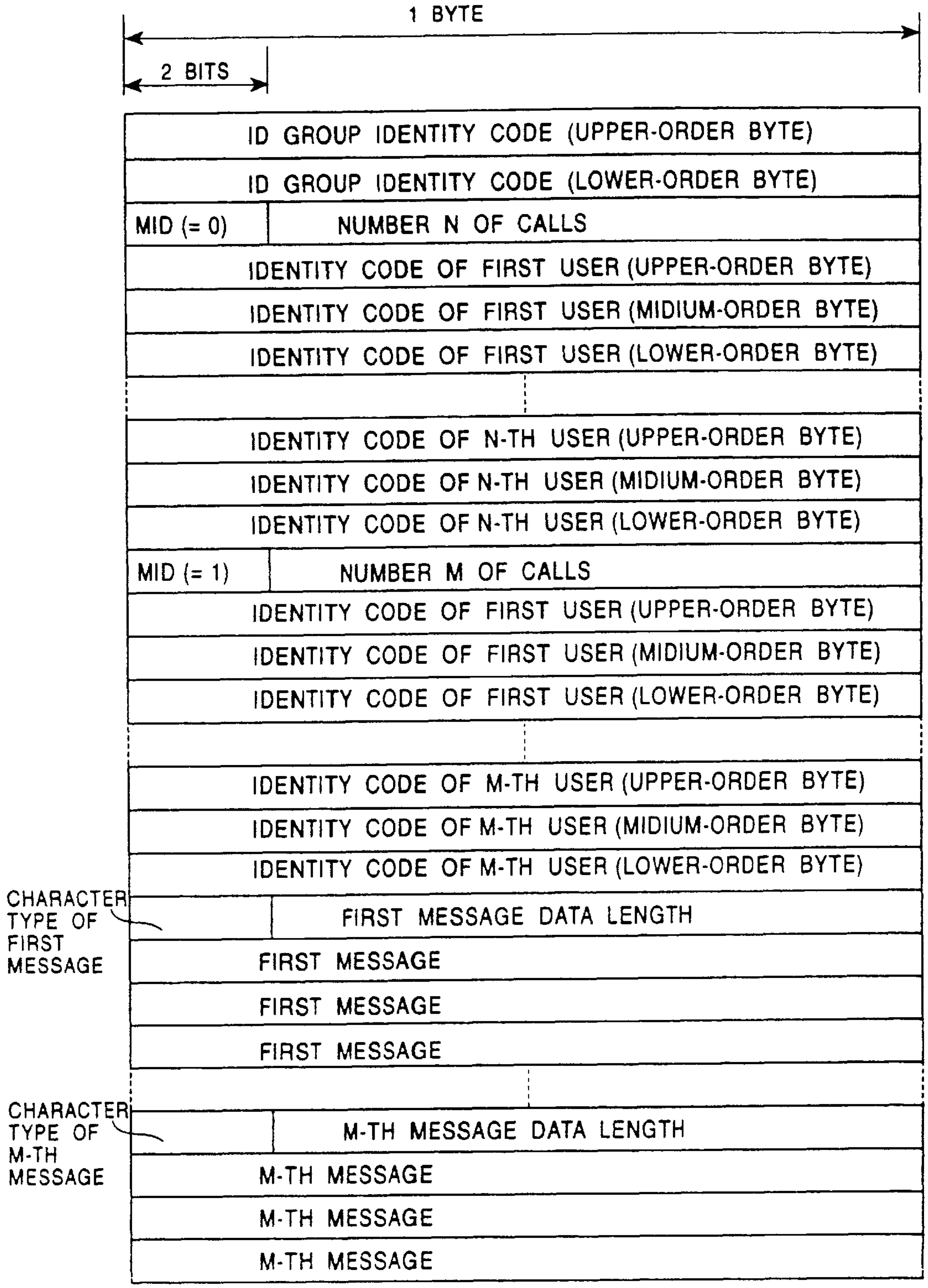
FIG. 10 shows the signal format.

As shown in FIG. 2, a seal 60 is pasted at a position where the appearance of the FM receiver is not degraded, for example, the rear side of the cabinet of the FM receiver, the housing section of a power battery, or the rear side of the lid of such battery housing section. A keyword 61 which is made up of predetermined alphanumerics (numerals, alphabet, or a combination of both) having a one-to-one correspondence with the identity code USRID written in the ROM 25 is displayed by, for example, printing on the seal 60. The keyword 61 is preferably such that the identity code USRID is not directly converted into characters, but some kind of encoding or encryption is performed on the identity code USRID.

The identity code USRID of the ROM 25 will now be considered. The identity code USRID is data which is unique to this FM receiver, and is not the same as the identity code of any other FM receiver. This type of FM receiver is provided by the maker with a production number (serial number) for each vehicle, and the serial number is printed on a seal and this seal is pasted in a part of the receiver.

Therefore, the keyword 61 of the seal 60 can be made to serve as a character which indicates the serial number of the FM receiver. This serial number is converted into an identity code USRID in accordance with a predetermined pattern, so that this code can be written as the identity code USRID in the ROM 25. Or, conversely, the identity code USRID of the ROM 25 is converted into the keyword 61, and this keyword can be displayed as a serial number on the seal 60.

With such a construction, when an FM text-based multiplex broadcast is received, and data obtained by performing error correction thereon is provided to the microcomputer 20 from a decoding circuit 41, it can be determined by checking, for example, the service identity code of the prefix for which of the general program or individual information service (paging service) that data is used.

In the case of data for a general program, of the received data, the data for the program selected by the predetermined key 42 is written into the RAM 24 and stored. Alternatively, data stored in the RAM 24 is read out by the CPU 21, the read-out data is converted into display data using the font data, and this display data is written in the memory 32.

At this time, the display data of the memory 32 is repeatedly read out by the display controller 33 and converted into display signals and provided to the LCD 50. Therefore, a program selected by the CPU 21 in accordance with the character based on the data read out from the RAM 24, i.e., the predetermined key 42, is displayed on the LCD 50.

On the other hand, if the data provided to the microcomputer 20 is information service data provided via the paging system, the identity code USRID written in the ROM 25 is compared with the identity code contained in the calling data of the information service.

When the identity code USRID of the ROM 25 of this FM receiver does not match any of the identity codes of the calling data, no process is performed on the calling data. Therefore, even if an information service is in operation, no process is performed for the users who are not a recipient of that information service.

However, when the identity code USRID of the ROM 25 of this FM receiver matches with any identity code of the calling data, the MID corresponding to the matching identity code is checked. Since the case of MID=0 corresponds to a case in which no message is present, a formation circuit 43 is driven through the port 28, forming a beep sound signal. This beep sound signal is provided to the amplifiers 16L and 16R, and a beep sound is output from the speakers 17L and 17R, respectively. If a predetermined key is pressed from among the keys 42, the beep sound signal is not formed. Therefore, the user is informed that there is a call, namely, that it is possible to use this FM receiver as a pager.

Since the case of MID=1 corresponds to a case in which a message is present, a corresponding message is taken out from the calling data, and is stored in the RAM 24. The message stored in this RAM 24 is converted into corresponding display data in accordance with the value indicated by the character type, and that message and the characters in accordance with the character type and the like are displayed on the LCD 50.

For example, when the character type indicates a fixed-type message, the message is converted into a character string (text) and further converted into display data by referring to the data table of the ROM 22, and is provided to the LCD 50 whereon a fixed-type message is displayed. When the character type indicates a character, the message is converted into display data as it is and provided to the LCD 50 whereon a message is displayed as characters, for example, stock prices or horse racing information, are displayed.

In this way, in this FM receiver, when no contract is signed with a broadcasting station side (the entrepreneur of the information service based on an FM text-based multiplex broadcast), the information service cannot be received; however, when a contract is signed, it is possible to receive various information services.

The user who has purchased this FM receiver cannot receive information services at the initial period of the purchase because even if the identity code USRID has been written in the ROM 25, there is no contract with a broadcasting station, and therefore, no identity code is transmitted. That is, when seen from the broadcasting station side, even if the identity code USRID has been written in the ROM 25, since the identity code is not transmitted, the information services are not able to be used free of charge.

However, when the user desires to receive information services, the user conveys the keyword 61 (and, the type of service, when there exits a ranking in the services) displayed on the seal 60 to the broadcasting station side, for example, by phone. In that event, the items to be conveyed to the broadcasting station side are usually, in addition to the keyword 61, the name of the user, the bank account number of the user during the subscription period, and the like. Thereupon, the broadcasting station side registers the name and the bank account number of the user in accordance with predetermined procedures, converts the conveyed keyword 61 into the identity code USRID, and transmits this code with this code contained in the calling data. Thereafter, the user becomes able to receive the information services offered.

In this way, in the FM receiver, since the identity code USRID is prepared in the ROM 25 beforehand and the keyword 61 having a one-to-one correspondence with the identity code USRID is prepared in the receiver, it becomes possible to receive information services by merely conveying the keyword 61 to the broadcasting station side.

Therefore, it is not necessary for the user to bring or send the FM receiver to the agency or the like in order to write an identity code in a ROM, namely, to make it possible to receive information services. Further, if the user makes up his/her mind to use information services, he/she becomes able to use information services early by taking simple procedures.

Further, it is not necessary for the agency and the like to prepare a ROM writer. Further, it is not necessary to train persons who are able to handle the ROM writer. As a result, costs can be reduced.

Since there is no need to provide a connector for connection purposes in the FM receiver when an identity code is written in the ROM 25, costs can be reduced.

Further, since the FM receiver contains the identity code USRID from the start, when the user proposes a contract for use of the information services, a new identity code can be sent using that identity code USRID and the message, and this new identity code can be written as a valid identity code into the ROM 25. Alternatively, data and programs can be sent to a specific FM receiver through a text-based multiplex broadcast, and data and functions required for the FM receiver can be changed.

In the above-described embodiment, instead of the ROM 25, the identity code USRID can be written in the ROM 22 or 31. Although in the above-described embodiment the keyword 61 is displayed on the seal 60, it is also possible to stamp the keyword 61 on a cabinet made of a synthetic resin of the FM receiver through heat treatment. Alternatively, it is possible to prepare the keyword 61 in an instruction manual supplied with the FM receiver.

According to the present invention, it is possible to receive information services by merely conveying a keyword to a broadcasting station side, and there is no need to bring or send the FM receiver to an information service agency or the like. Further, it becomes possible to use information services early and easily. Further, costs can be reduced in an agency and the like.

Further, it is possible to reduce the cost of the FM receiver, so that data and programs can be sent to a specific FM receiver through a text-based multiplex broadcast, and data and functions required for the FM receiver can be changed.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A receiver for a broadcast in which data that does not require a contract, data that requires said contract, and an identity code for specifying a user are multiplexed onto a main signal and transmitted, the receiver comprising:

a receiving circuit for receiving said broadcast;

a display element connected to said receiving circuit;

a memory in which an identifying code uniquely identifying the receiver is written;

a circuit connected to said receiving circuit and said memory for determining whether said identity code contained in said broadcast received by said receiving circuit coincides with the identifying code written in said memory;

means for disclosing a keyword to said user of the receiver, said keyword corresponding to the identifying code written in said memory; and means for communicating said keyword from said user to a station generating said broadcast, wherein said identity code is generated based on said communicated keyword, and wherein when said circuit for determining determines that the identifying code written in said memory does not coincide with the identity code contained in said broadcast received by said receiving circuit, said receiving circuit is controlled so that information services based on said data that requires said contract cannot be displayed, and when said circuit for determining determines that the identifying code written in said memory coincides with the identity code contained in said broadcast received by said receiving circuit, information services based on said data that requires said contract are performed.

2. A receiver according to claim 1, wherein when said circuit for determining determines that the identifying code written in said memory coincides with the identity code contained in said broadcast received by said receiving circuit, characters based on said data that does not require said contract are displayed on said display element, and when said circuit for determining determines that the identifying code written in said memory does not coincide with the identity code contained in said broadcast received by said receiving circuit, characters based on said data that does not require said contract are displayed on said display element and information services based on said data that does not require said contact are performed.

3. A receiver according to claim 1, wherein said means for displaying is a label affixed to said receiver and said keyword is a production number.

4. A receiver according to claim 1, wherein said information service is a service based on paging.

* * * * *